(12) United States Patent
Wise et al.

(10) Patent No.: US 8,363,388 B2
(45) Date of Patent: Jan. 29, 2013

(54) SYSTEM AND METHOD FOR SUPPLYING POWER TO ELECTRONICS ENCLOSURES UTILIZING DISTRIBUTED DC POWER ARCHITECTURES

(75) Inventors: Jeffrey L. Wise, Acton, MA (US); Pasi Jukka Vaananen, Waltham, MA (US); Stephen A. Hauser, Carlisle, MA (US); James J. Dorsey, Tempe, AZ (US)

(73) Assignee: Emerson Network Power—Embedded Computing, Inc., Madison, WI (US)

(*) Notice: Subject to any disclaimer, the term of this patent is extended or adjusted under 35 U.S.C. 154(b) by 0 days.

(21) Appl. No.: 12/580,498

(22) Filed: Oct. 16, 2009

(65) Prior Publication Data
US 2010/0220432 A1    Sep. 2, 2010

Related U.S. Application Data

(60) Provisional application No. 61/106,290, filed on Oct. 17, 2008.

(51) Int. Cl.
*H05K 7/00* (2006.01)
*H01B 7/30* (2006.01)
*H02J 7/00* (2006.01)

(52) U.S. Cl. ......... 361/622; 361/641; 361/648; 361/624

(58) Field of Classification Search ................. 361/624, 361/647, 648, 622, 641
See application file for complete search history.

(56) References Cited

U.S. PATENT DOCUMENTS

| | | | |
|---|---|---|---|
| 5,726,506 A * | 3/1998 | Wood | 307/147 |
| 5,770,898 A | 6/1998 | Hannigan et al. | |
| 5,831,346 A * | 11/1998 | Baumann et al. | 307/64 |
| 5,861,684 A * | 1/1999 | Slade et al. | 307/66 |
| 6,066,900 A * | 5/2000 | Chan et al. | 307/38 |
| 6,489,748 B1 * | 12/2002 | Okamura | 320/116 |
| 6,563,706 B1 * | 5/2003 | Strickler | 361/695 |
| 6,677,687 B2 * | 1/2004 | Ho et al. | 307/43 |
| 6,795,885 B1 * | 9/2004 | deBlanc et al. | 710/305 |
| 6,833,634 B1 * | 12/2004 | Price | 307/18 |
| 7,126,820 B2 * | 10/2006 | Wei | 361/695 |
| 7,141,893 B2 * | 11/2006 | Hanahan et al. | 307/64 |
| 7,215,552 B2 | 5/2007 | Shipley et al. | |
| 7,394,169 B2 * | 7/2008 | Lanus et al. | 307/64 |
| 7,394,170 B2 * | 7/2008 | Kirkorian | 307/69 |

(Continued)

OTHER PUBLICATIONS

Intel Corporation, "Intel Netstructure MPCHC0001 14U Shelf, Preliminary Technical Product Specification", pp. 75-86, Dec. 2003.
Chinese Office Action for Chinese Patent Application No. 200910206105.1, dated Jul. 13, 2012, and English translation thereof.

*Primary Examiner* — Anatoly Vortman
(74) *Attorney, Agent, or Firm* — Harness, Dickey & Pierce, P.L.C.

(57) ABSTRACT

A power entry module (PEM) that is used with an electronics equipment enclosure. The PEM has a housing adapted to be coupled to a shelf of the electronics equipment enclosure. The housing has at least one pair of power cable lugs accessible from an exterior of the housing for coupling the PEM to a pair of power cables associated with a power feed. The PEM also has a backplane connector for coupling the PEM to a backplane of the electronics enclosure. A distribution network is disposed within the PEM housing and forms at least a pair of electrically isolated power distribution buses for coupling electrical power provided from the power cables to each of the power distribution branches. Each power distribution branch independently provides electrical power to at least one blade supported within the electronics equipment enclosure.

20 Claims, 4 Drawing Sheets

U.S. PATENT DOCUMENTS

| | | |
|---|---|---|
| 7,652,891 B2 | 1/2010 | Lucero et al. |
| 7,944,082 B1 * | 5/2011 | Gill .................................. 307/19 |
| 2005/0099772 A1 * | 5/2005 | Wei ............................... 361/695 |
| 2006/0220464 A1 * | 10/2006 | Hanahan et al. ................. 307/64 |
| 2008/0259555 A1 * | 10/2008 | Bechtolsheim et al. ....... 361/686 |
| 2010/0259100 A1 * | 10/2010 | Hamstra et al. ................. 307/18 |

* cited by examiner

_US 8,363,388 B2_

SYSTEM AND METHOD FOR SUPPLYING POWER TO ELECTRONICS ENCLOSURES UTILIZING DISTRIBUTED DC POWER ARCHITECTURES

CROSS REFERENCE TO RELATED APPLICATIONS

The present application claims priority from U.S. provisional patent application Ser. No. 61/106,290, filed Oct. 17, 2008, the entire contents of which is hereby incorporated by reference into the present application.

FIELD

The present disclosure relates to systems and methods for supplying power to electronics enclosures, and more particularly to power entry modules (PEMs) used with systems requiring electrical power to be distributed to a plurality of electronics modules within an enclosure.

BACKGROUND

The statements in this section merely provide background information related to the present disclosure and may not constitute prior art.

One-to-one redundant power systems are often employed in present day Advanced TCA (Telecommunications Computing Architecture) (hereinafter "ATCA") electronics equipment enclosures. Typically such enclosures make use of a plurality of shelves that each may support a plurality of "blades" (electronic printed circuit board modules) in side-by-side fashion. ATCA compliant enclosures typically have two power sources, and therefore use separate power entry modules ("PEMs") in the electronics enclosure for each power source. One PEM is used for each power feed. Each power feed is formed by two cables: a power feed cable and a power return cable. The power feed and power return cables of a single power feed are coupled to a power branch within the enclosure. Each power branch within the enclosure is typically formed by a pair of power buses composed of a feed bus and a return bus that provide power to a subset of the blades in a particular shelf of the enclosure. Within the enclosure, after the PEMs, each power branch stays completely isolated from all the other power branches. The power branches of one PEM are thus all fully isolated from all of the other branches of other PEMs. Typically a redundant PEM or PEMs are employed with the enclosure and are coupled to separate power feed(s) from the other power source to form a backup power feed for a given branch within the enclosure.

With present day ATCA compliant enclosures, a PEM is used to interface each cabled power feed with a single power branch. Each power branch distributes power to one or more blades associated with the branch. "B" power branches distribute the power to the "M" blades per power branch. Within the PEM, the power feeds are connected to the power branches such that each power branch is driven from one and only one power feed. An example of such a typical present day configuration is shown in FIG. 1.

Although not shown in FIG. 1, typical ATCA compliant enclosures have shelves that include redundant PEM or PEMs and another set of power branch buses that drive each of the same blades in parallel to the power system diagrammed above. The power source is typically a −48 VDC battery bank, but the present disclosure is not limited to such cases.

With present day systems as shown in FIG. 1, an enclosure with four power branches per power source can have, for example, PEMs with: 1 power feed at 100 amps, 2 power feeds at 80 amps each, or 4 power feeds at 75 amps each. Because the power branches radiating outward from the power source cannot re-converge, there can be at most one power feed per branch. Thus, the single-feed PEM fans out its one power feed to the enclosure's four branches. Alternatively, the dual-feed PEM may fan out each of its two power feeds to two of the branches, and the quad-feed PEM directly connects each feed to only one power branch. Note that each PEM variant is required to drive all the power branches in the enclosure, or else some blades would receive no power. Presently, power feeds are limited to about 100 amps per cable set because of restrictions on the diameters of the cables that may be wired to a shelf of an ATCA compliant enclosure. The above limitations thus often find the system designer using a PEM or PEMs with a greater number of power feeds than what is needed for the power requirements of a given card configuration in an enclosure. This serves to increase the overall cost of the system. However, installing a PEM with only a single power feed connection to all the cards in the shelf may result in significant and costly work to reconfigure the enclosure in the event that the configuration of blades within the enclosure is changed at a later date.

SUMMARY

In one aspect the present disclosure is directed to a power entry module (PEM). The PEM may include a housing adapted to be coupled to a backplane of an electronics equipment enclosure. At least one pair of power cable lugs may be provided that is accessible from an exterior of the housing for coupling the PEM to a pair of power cables associated with a power feed. A backplane connector may be used for electrically coupling the PEM to a blackplane of the electronics equipment enclosure. A distribution network may be disposed within the PEM housing and may form at least a pair of electrically isolated power distribution branches. The electrically isolated power distribution branches may couple electrical power provided from the power cables to each of the electrically isolated power distribution branches and provide a return path for current flowing through each electrically isolated power distribution branch. Each of the electrically isolated power distribution branches may independently provide electrical power to at least one blade associated therewith.

In another aspect the present disclosure is directed to a power entry module (PEM) that may include a housing adapted to be coupled to a component of an electronics equipment enclosure. First and second pairs of power cable lugs, accessible from an exterior of the housing, may be used for coupling the PEM to two pairs of power cables associated with first and second power feeds. A backplane connector may couple the PEM to a blackplane of the electronics equipment enclosure. A distribution network disposed within the PEM housing may form at least first, second and third independent, electrically isolated power distribution branches. The distribution network may be adapted to feed electrical power from the first power feed to the first electrically isolated power distribution branch. The distribution network may be adapted to feed electrical power from the second power feed to the second and third electrically isolated power distribution branches, independently of the first electrically isolated power distribution branch.

In still another aspect the present disclosure is directed to a method for forming a power entry module (PEM) for use in an electronics equipment enclosure to interface at least one power feed to a plurality of blades housed in the electronics equipment enclosure. The method may include providing a PEM housing adapted to be coupled to a component of the electronics equipment enclosure. At least one pair of power cable lugs, accessible from an exterior of the housing, may be used for coupling the PEM to a pair of power cables associated with the at least one power feed. An electrical connector may be used to couple the PEM housing to the component of the electronics equipment enclosure. A power distribution network within the PEM housing may have at least a pair of electrically isolated power distribution branches for coupling electrical power supplied to the power cable lugs to each of the electrically isolated power distribution branches. Each electrically isolated power distribution branch may be configured to independently provide electrical power to at least first and second ones of the plurality of blades housed within the electronics equipment enclosure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
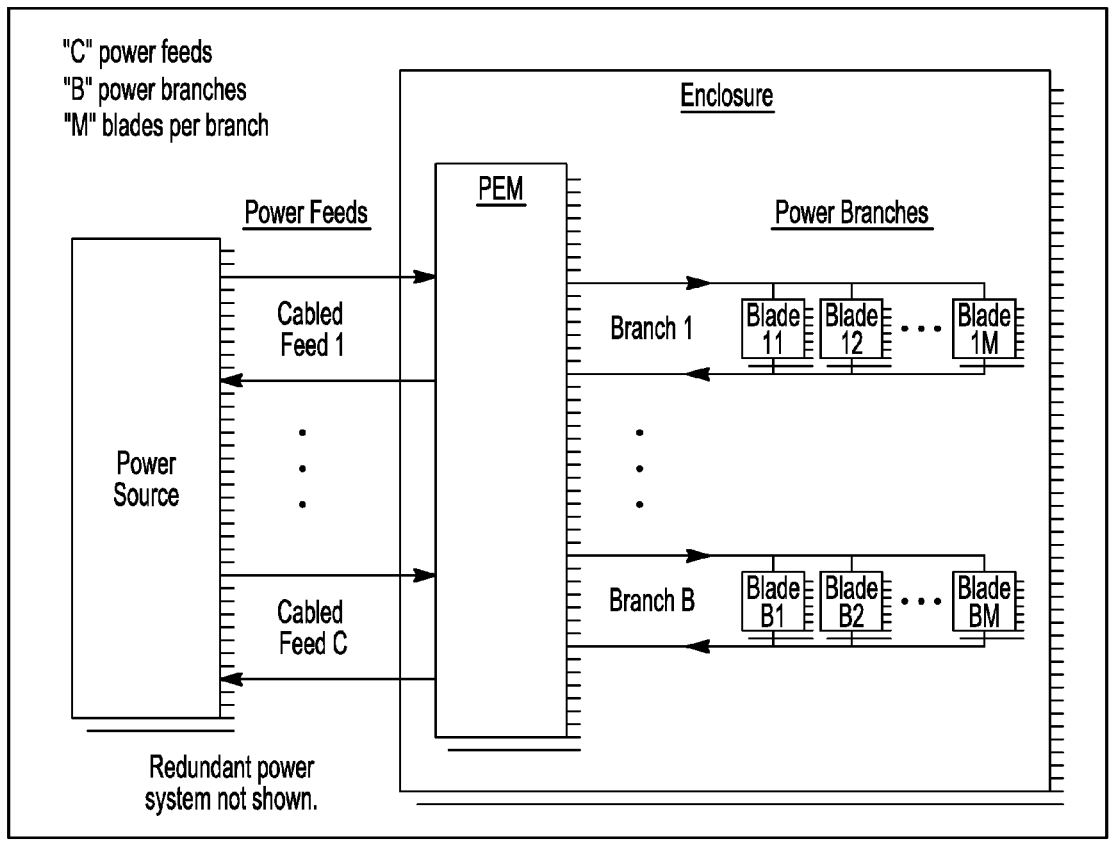
FIG. 1 is a view of a prior art, multi-feed, multi-branch power architecture arrangement where independent power feeds are interfaced to independent power branches by a conventional power entry module (PEM), and where each power feed can handle only a single power branch.

The following description is merely exemplary in nature and is not intended to limit the present disclosure, application, or uses. It should be understood that throughout the drawings, corresponding reference numerals indicate like or corresponding parts and features.

Figure 2:
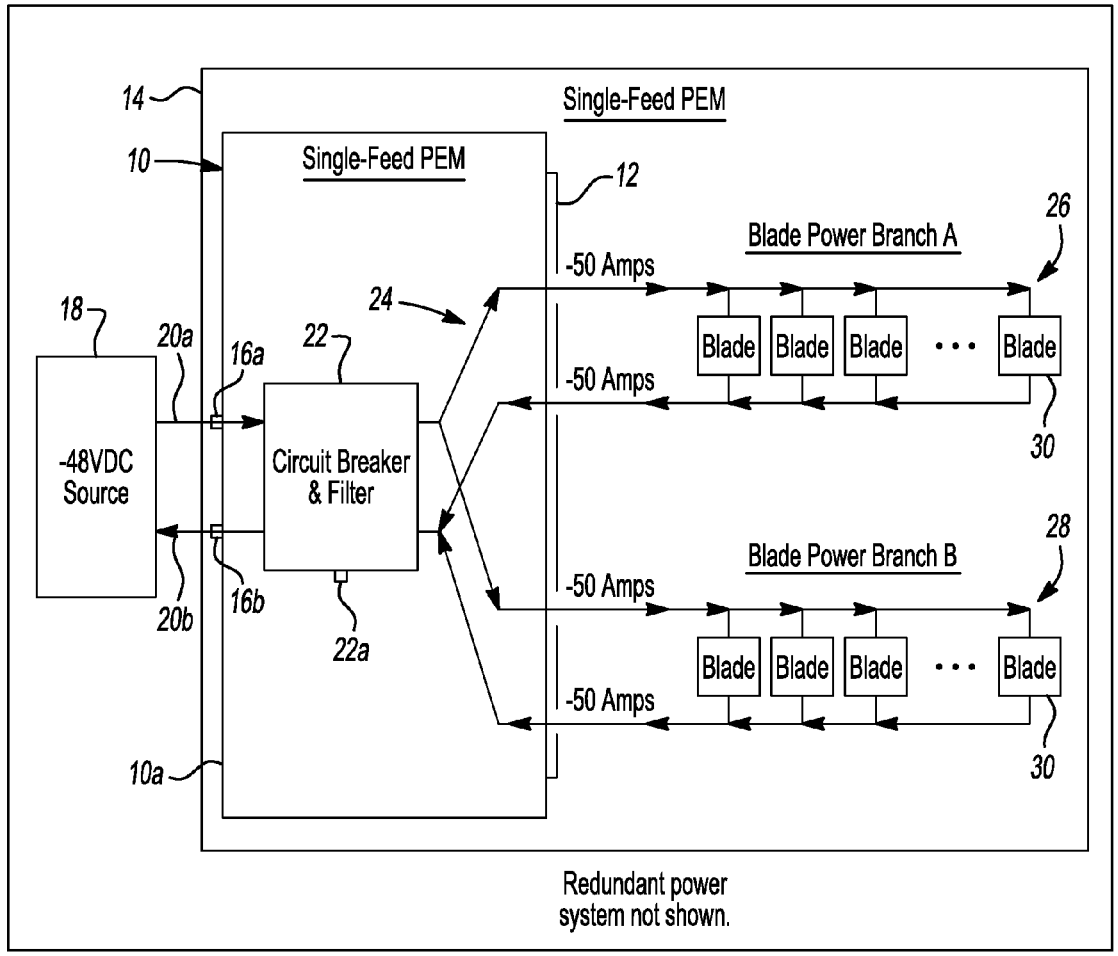
FIG. 2 is a schematic view of one embodiment of a PEM in accordance with the present disclosure in which a power distribution network is formed entirely within the PEM housing, and wherein a single power feed may be used to feed electrical power to more than one power branch.

Referring to FIG. 2, there is shown a power entry module (PEM) 10 in accordance with one embodiment of the present disclosure. The PEM 10 has a housing 10a having standardized dimensions that enable it to be connected to a backplane 12 within an electronics equipment enclosure 14. The housing 10a includes input power lugs 16a and 16b that interface the PEM 10 to an external power source 18. For example, power lug 16a may be coupled to a power supply cable 20a while power lug 16b is independently coupled to a power return cable 20b. The power cables 20a/20b may supply a desired current feed, for example 100 amp, to the PEM 10. A circuit breaker and filter subsystem 22 is also included with the PEM. The circuit breaker and filter subsystem 22 may have a reset button 22a projecting through the housing 10a that enables a user to manually reset the circuit breaker portion of the circuit breaker and filter subsystem 22 in the event the circuit breaker has been tripped.

The PEM 10 includes a power distribution network 24 contained entirely within its housing 10a. In this example the distribution network 24 fans out the current supplied from the current feed to two electrically isolated power branches 26 and 28. Each branch 26 and 28 includes at least one, but typically more than one, blade 30 that is powered by the current received through its associated branch. The blades 30 in each branch 26 and 28 are typically located in the same shelf of the enclosure 14.

It is a principal advantage of the PEM 10 that the entire distribution network 24 is housed within the housing 10a of the PEM 10. Thus, simply plugging the PEM 10 into the backplane 12 of the enclosure 14 serves to make the needed connections with both of the power branches 26 and 28. While FIG. 2 illustrates only two power branches, it will be appreciated that the PEM 10 could be formed with an internal distribution network that is able to supply power to more than two independent power branch circuits. Thus, the PEM 10 is constructed in accordance with power branch requirements of the enclosure with which it is being used. By locating the entire power distribution network with the PEM 10, this enables a different PEM having a slightly different power distribution configuration to be implemented without the need for changing out the backplane of the enclosure to implement a different power distribution configuration.

Figure 3:
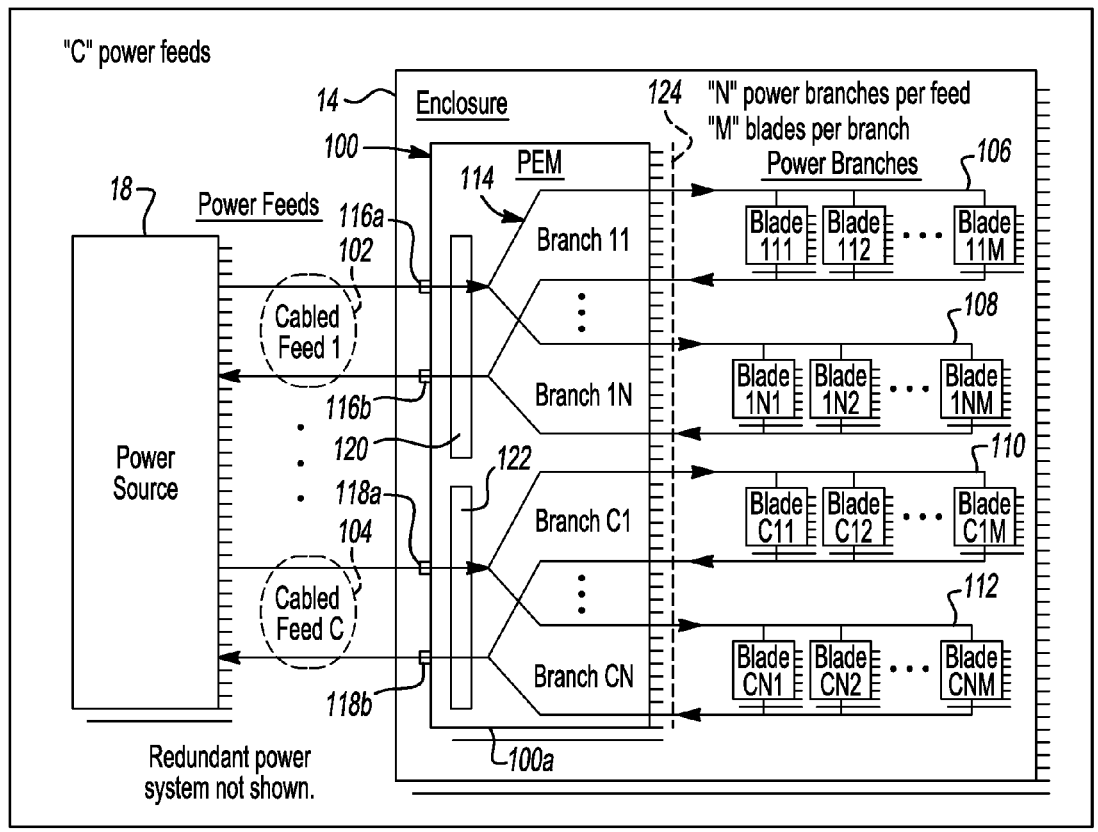
FIG. 3 is a schematic view of another embodiment of the PEM of the present disclosure in which the PEM interfaces a pair of independent power feeds to a plurality of independent power branches, with each power feed supplying electrical power to a plurality of power branches, and with all of the power distribution being accomplished within the PEM housing.

Referring to FIG. 3, a PEM 100 in accordance with another embodiment of the present disclosure is illustrated. The PEM 100 is similar to the PEM 10 except that the PEM 100 is capable of receiving power from at least two independent cable power feeds 102 and 104 and distributing the power to a plurality of power branches 106, 108, 110 and 112. This is accomplished by an internal power distribution network 114 housed entirely within a housing 100a of the PEM 100. Cable power feed 102 is coupled to power lugs 116a and 116b while cable power feed 104 is coupled to power lugs 118a and 118b. Power lugs 116a and 118a feed current into the distribution network 114 while power lugs 116b and 118b form part of a return feed for each cable power feed 116 and 118. Two independent circuit breaker and filter subsystems 120 and 122 are also preferably included in the PEM 100, one for each of the power cable feeds 102 and 104. A backplane 124 of the enclosure 14 receives the PEM 100.

In the example of FIG. 3, the PEM 10 power distribution network is configured so that the cable power feed 102 supplies power to the two shown electrically isolated power branches 106 and 108, while cable power feed 104 supplies power to two electrically isolated power branches 110 and 112. Again, since all of the power distribution connections are formed within the PEM housing 100a, no jumpers or straps are required to make the needed connections with the power branches 106, 108, 110 and 112. Since the mapping of the power feeds 102 and 104 into the power branches 106-112 is done entirely within the PEM 100, the PEM 100 can use virtually any specific power distribution mapping without physical changes being required anywhere else in the system. This characteristic of the PEM 10 or 100 allows a wide range of applications (i.e., low to high power blades) to be addressed at a minimum cost for each application.

It will be appreciated that PEM 100 could easily be modified so that cable power feed 102 feeds only a single power branch, while power feed 104 feeds two or more isolated power branches. Alternatively, three or more cable power feeds could be coupled to the PEM 100 provided the PEM 100 is modified to include a suitable additional number of power lugs to enable attachment of all the cable power feeds. The internal power distribution network of the PEM 100 would also be modified to accommodate the additional power branches that would be fed by each cable power feed.

Figure 4:
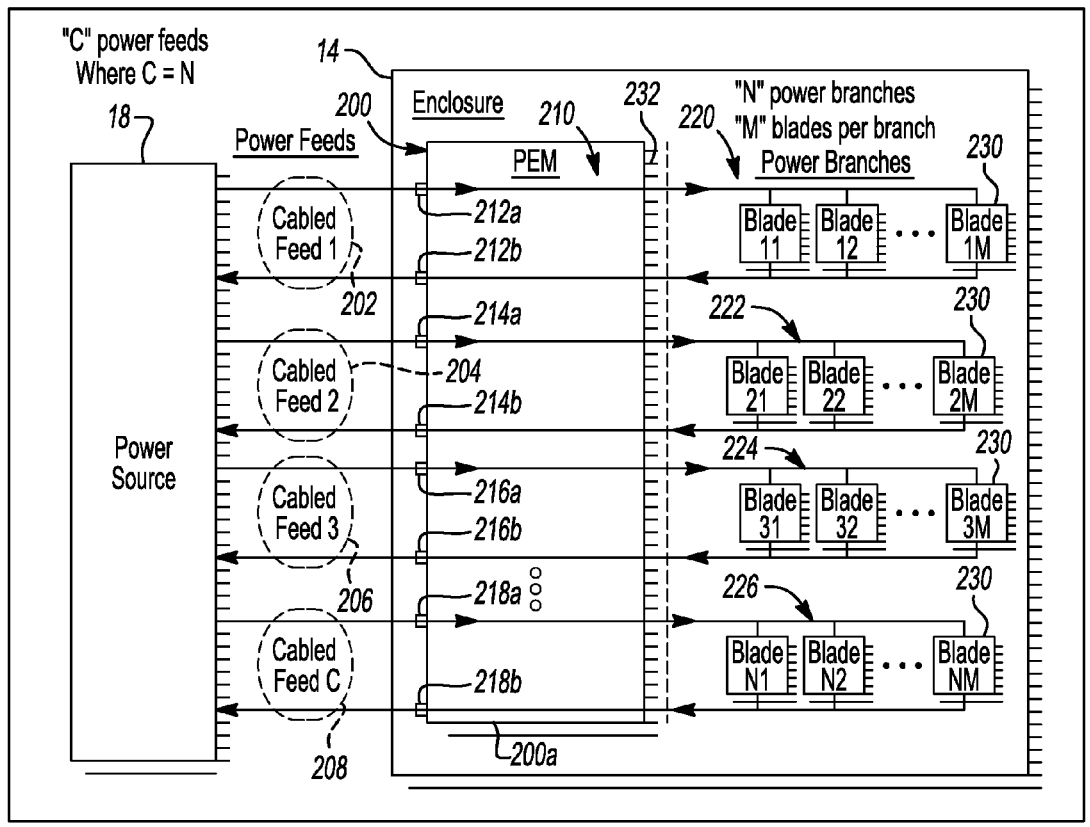
FIG. 4 is a schematic view of another embodiment of the PEM of the present disclosure in which each separate power feed feeds electrical power to a single associated power branch.

Referring to FIG. 4, a PEM 200 in accordance with another embodiment of the present disclosure is shown. The PEM 200 allows four independent cable power feeds 202, 204, 206 and 208 to be interfaced to an internal distribution network 210 within a housing 200a of the PEM 200. The PEM 200 includes four pairs of power lugs 212, 214, 216 and 218 that couple power to four independent power branches 220, 222, 224 and 226, respectively. Thus, in this example each power feed supplies power to only one power branch. Each of the power lugs 212, 214, 216 and 218 has a power supply lug 212a, 214a, 216a and 218a that each supplies power to its respective power branch. Power lugs 212b, 214b, 216b and 218b form parts of power return paths for each power feed. Although not shown to avoid cluttering the figure, the PEM 200 preferably includes four independent circuit breaker and filter subsystems (such as described for PEMs 10 and 100), in other words one for each cable power feed 202, 204, 206 and 208. Each power branch 220, 222, 224 and 226 feeds current to one or more blades 230. The PEM 200 is coupled to a backplane connector 232 of the enclosure 14. If desired, a greater or lesser number of power feed lugs, with a corresponding number power branches, could be implemented to meet the needs of a specific application.

The PEMs 10, 100 and 200 enable significantly improved flexibility to be achieved in configuring an enclosure for specific needed power requirements. For example, an enclosure with four power branches per power source can have PEMs with: 1 power feed at 100 amps, 2 power feeds at 80 amps each, or 4 power feeds at 75 amps each. Because the power branches radiating outward form the power source cannot re-converge, there can be at most one feed per branch. So, the single-feed PEM (such as PEM 10) fans out its one power feed to the enclosure's four branches, the dual-feed PEM (such as PEM 100) fans out each of its feeds to two of the branches, and the quad-feed PEM 200 directly connects each feed to a single power branch. Note that each PEM variant (10, 100 and 200) is required to drive all the power branches in the enclosure or else some blades would receive no power.

Present day restrictions in the size of power cables that can be routed to the enclosure 14 limit the current carrying capacity of a single power feed cable to about 100 amps. Thus, the single cable power feed PEM supports the lowest power per blade, and would be the lowest cost PEM. The two-feed PEM will support upwards of twice the power per blade at a slightly increased PEM cost, and the four-feed PEM, at the highest cost, will support the highest number of power blades with four cable power feeds delivering power to the enclosure 14. The system designer picks the specific PEM configuration that is appropriate for the power level of the blades that will be installed in a specific enclosure.

Previously designed multiple-feed shelf power systems have used a scheme that is generally inflexible and adds cost to systems that do not need higher power currents. For example, some previous shelves have used a physically separate PEM for each power feed into a given shelf. This forces the shelf to have a PEM for each group of blades (i.e., one PEM for each power branch) regardless of whether higher power currents are needed or not. Systems that can operate from the power of a single set of cables (i.e., 100 or less amps) are required in this scheme to have multiple PEMs even though they aren't needed to receive multiple sets of power feed cables. This approach increases product cost unnecessarily.

Each PEM also requires components regardless of its power architecture, such as an IPMC, mechanical components for enclosing and shielding the PEM, and inserting and ejecting the PEM onto and from the backplane, etc. Thus, system level costs are reduced by minimizing the number of PEMs to only that specific minimum number that needs to be used to adequately power all the blades being used in the enclosure.

The PEMs 10, 100 and 200 are advantageous because they enable the most cost effective configuration of PEM to be implemented for a given cardage configuration. Thus, a specific PEM (e.g., PEM 200) may be selected for higher power shelf systems (i.e., 300 W+ per blade) where a multiple cable power feed power is needed, while a PEM having a different internal power distribution network and a single cable power feed (e.g., PEM 10) may be used for lower power systems. Thus, the specific configuration of PEM can be selected to avoid the cost penalty that would otherwise be associated with using a PEM having greater power supply and distribution capabilities than needed for a particular application.

Another advantage that the PEMs 10, 100 and 200 provide is the ease with which the power system configuration can be identified. Whether a shelf is configured for dual-feed power or single-feed power is immediately visible externally by counting the power lugs on the PEM 10, 100 or 200 being used. Because the transition from multiple-feed to/from single-feed is accomplished by merely changing the PEMs, the shelf manager can know with 100% confidence how the system is configured by reading the type of PEM installed. There is no other component or factor that determines the power system configuration, and no special cover plates or dummy PEMs that a technician or field engineer would need to consider to understand the specific power configuration of a particular enclosure. Other schemes that involve external straps between PEMs or straps mounted on the backplane cannot be identified so easily. Also, all of the PEMs 10, 100 and 200 install the same way on the backplane of the enclosure 14, the only difference being how many power feed cables are attached to the PEM 10, 100 or 200.

From a system configuration point of view, systems using one of the PEMs 10, 100 or 200, or variations thereof, are essentially foolproof in their setup. For each power source, the number of power feeds into the enclosure 14 is determined by the single fact of which type PEM is installed on that side of the enclosure 14. It does not matter electrically if the PEM for one power source is dual-feed, and the PEM for the other power source is single-feed. Since both types of PEMs are the same size, there is never a need for a special cover plate or dummy PEM. There is only one place each PEM can be inserted into the shelf (i.e., enclosure) to be coupled with the backplane, so there is no difficult in-between positioning to be done when installing the PEMs 10, 100 or 200. Also, with the PEMs 10, 100 or 200 inserted into the system, the number of power feeds is immediately visible by one simply counting the power lugs on the PEM faces. There is no strapping installed within the enclosure 14 that would not be visible from outside the enclosure. So configuring enclosures using the PEMs 10, 100, 200, or variations thereof, is quick and easy to accomplish.

While the various embodiments described herein are especially well suited for use with AdvancedTCA shelves, the PEMs 10, 100 and 200 can potentially be implemented with virtually any standard or non-standard electronics enclosure that requires a distributed DC power architecture. Therefore, it will be appreciated that the various embodiments described herein will not be limited in application to only AdvancedTCA systems.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A power entry module (PEM) comprising:
    a PEM housing adapted to be coupled to a backplane of an electronics equipment enclosure;
    at least one pair of power cable lugs accessible from an exterior of the housing for coupling the PEM to a pair of power cables associated with a power feed;
    a backplane connector for electrically coupling the PEM to a backplane of the electronics equipment enclosure;
    a distribution network entirely disposed within the PEM housing and forming at least a pair of electrically isolated power distribution branches, for coupling electrical power provided from the power cables to each of said electrically isolated power distribution branches, and for providing a return path for current flowing through each said electrically isolated power distribution branch; and
    where each said electrically isolated power distribution branch independently provides electrical power to at least one blade associated therewith; and
    wherein the distribution network being entirely disposed with the PEM housing permits a second PEM housing having a second distribution network entirely disposed within the second PEM housing to be substituted for the PEM housing without modification to the backplane, and wherein the second distribution network differs from the distribution network in the PEM housing.

2. The PEM of claim 1, further comprising a circuit breaker in electrical communication with said pair of power cable lugs.

3. The PEM of claim 2, further comprising a filter associated with said circuit breaker.

4. The PEM of claim 1, wherein the PEM housing includes a second pair of power cable lugs for coupling the PEM housing to a second pair of power cables supplying power to the PEM.

5. The PEM of claim 4, wherein said PEM housing includes:
    a second pair of power cable lugs for supplying power to a second electrically isolated power distribution branch within the PEM housing;
    a third pair of power cable lugs for supplying power to a third electrically isolated power distribution branch within the PEM housing; and
    a fourth pair of power cable lugs for supplying power to a fourth electrically isolated power distribution branch within the PEM housing.

6. The PEM of claim 5, wherein:
    said second electrically isolated power distribution branch independently supplies power to a second plurality of blades;
    said third electrically isolated power distribution branch independently supplies power to a third plurality of blades; and
    said fourth electrically isolated power distribution branch independently supplies power to a fourth plurality of blades.

7. A power entry module (PEM) comprising:
    a PEM housing adapted to be coupled to a backplane of an electronics equipment enclosure;
    at least one pair of power cable lugs accessible from an exterior of the housing for coupling the PEM to a pair of power cables associated with a power feed;
    a backplane connector for electrically coupling the PEM to a backplane of the electronics equipment enclosure;
    a distribution network disposed within the PEM housing and forming at least a pair of electrically isolated power distribution branches, for coupling electrical power provided from the power cables to each of said electrically isolated power distribution branches, and for providing a return path for current flowing through each said electrically isolated power distribution branch and where each said electrically isolated power distribution branch independently provides electrical power to at least one blade associated therewith;
    the PEM housing includes a second pair of power cable lugs for coupling the PEM housing to a second pair of power cables supplying power to the PEM;
    the one pair of power cable lugs supplies power to said at least a pair of electrically isolated power distribution branches; and
    said second pair of power cable lugs supplies power to an additional electrically isolated power distribution branch.

8. The PEM of claim 7, further comprising an additional circuit breaker and filter subsystem independently associated with said second pair of power cables.

9. A power entry module (PEM) comprising:
    a housing adapted to be coupled to a component of an electronics equipment enclosure;
    first and second pairs of power cable lugs accessible from an exterior of the housing for coupling the PEM to two pairs of power cables associated with first and second power feeds;
    a backplane connector for coupling the PEM to a backplane of the electronics equipment enclosure; and
    a distribution network disposed within the PEM housing and forming at least first, second and third independent, electrically isolated power distribution branches;
    said distribution network adapted to feed electrical power from said first power feed to said first electrically isolated power distribution branch; and
    said distribution network adapted to feed electrical power from said second power feed to said second and third electrically isolated power distribution branches, independently of said first electrically isolated power distribution branch.

10. The apparatus of claim 9, wherein:
    said first electrically isolated power distribution branch independently feeds electrical power to at least one first blade of said first electrically isolated power distribution branch;
    said second distribution branch independently feeds electrical power to at least one second blade of said second electrically isolated power distribution branch; and
    said third electrically isolated power distribution branch independently feeds electrical power to at least one third blade of said third electrically isolated power distribution branch.

11. The apparatus of claim 9, further comprising:
a first circuit breaker operably associated with said first pair of power cable lugs and said first power feed; and
a second circuit breaker operable independently of said first circuit breaker and associated with said second pair of power cable lugs and said second power feed.

12. The apparatus of claim 11, further comprising:
a first filter operably associated with said first pair of power cable lugs and said first power feed; and
a second filter operable independently of said first filter and associated with said second pair of power cable lugs and said second power feed.

13. The apparatus of claim 12, wherein:
said first circuit breaker and said first filter form a first integrated subassembly located within said PEM housing; and
said second circuit breaker and said second filter form a second integrated subassembly located within said PEM housing.

14. The apparatus of claim 9, wherein the PEM housing is electrically coupled to a backplane of the electronics equipment enclosure.

15. A method for forming a power entry module (PEM) for use in an electronics equipment enclosure to interface at least one power feed to a plurality of blades housed in the electronics equipment enclosure, the method comprising:
providing a PEM housing adapted to be coupled to a component of the electronics equipment enclosure;
using at least one pair of power cable lugs accessible from ah exterior of the housing for coupling the PEM to a pair of power cables associated with the at least one power feed;
using an electrical connector for coupling the PEM housing to the component of the electronics equipment enclosure;
forming a power distribution network entirely within the PEM housing that has at least a pair of electrically isolated power distribution branches positioned entirely within the PEM housing, the PEM when plugged into the backplane providing connections for coupling electrical power supplied to the power cable lugs to each of the electrically isolated power distribution branches; and
configuring each said electrically isolated power distribution branch to independently provide electrical power to at least first and second ones of the plurality of blades housed within the electronics equipment enclosure.

16. The method of claim 15, wherein said using an electrical connector to couple the PEM housing to the component of the electronics equipment enclosure comprises using an electrical connector associated with the PEM housing to electrically couple the at least a pair of electrically isolated power distribution branches to a backplane of the electronics equipment enclosure.

17. The method of claim 15, further comprising placing a circuit breaker in communication with the at least one pair of power cable lugs.

18. The method of claim 15, further comprising placing a filter in communication with the at least one pair of power cable lugs.

19. The method of claim 15, further comprising placing an integrated subsystem comprising a circuit breaker and a filter, in communication with the at least one pair of power cable lugs.

20. The method of claim 15, further comprising:
providing an additional pair of power cable feed lugs on the PEM housing; and
independently interfacing the additional pair of power cable feed lugs to at least a third electrically isolated power distribution branch within the PEM housing, which is electrically isolated from each one of said pair of electrically isolated power distribution branches.

\* \* \* \* \*